INVENTOR
DONALD R. DUSTIN
BY Bernard M. Goldman
ATTORNEY

Nov. 22, 1966 D. R. DUSTIN 3,287,714

DESKEWING UTILIZING A VARIABLE LENGTH GATE

Filed Dec. 24, 1962 3 Sheets-Sheet 2

Nov. 22, 1966 D. R. DUSTIN 3,287,714

DESKEWING UTILIZING A VARIABLE LENGTH GATE

Filed Dec. 24, 1962 3 Sheets-Sheet 3

United States Patent Office 3,287,714

Patented Nov. 22, 1966

3,287,714

DESKEWING UTILIZING A VARIABLE LENGTH GATE

Donald R. Dustin, Salt Point, N.Y., assignor to International Business Machines Corporation, New York, N.Y., a corporation of New York Filed Dec. 24, 1962, Ser. No. 246,708

6 Claims. (Cl. 340—174.1)

This invention relates generally to means for increasing the maximum tolerable skew during a data transfer of a block of binary coded data bytes.

A "byte" in this specification is a group of bits transmitted in parallel over a plurality of parallel channels, which for example can be represented by a plurality of carrier frequencies, by a plurality of phases or phase shifts of a single carrier frequency, or by a plurality of transmission lines. A "byte" for example may be a coded character with parity, or a part of a large binary word, etc.

This invention is particularly useful for increasing the reliability of binary data transferred from magnetic tape.

It is common to record data on tape at any of many densities, such as 800 bits per inch in any track. Skew problems increase as the bit density on tape is increased.

It is common to record data on tape using NRZI or NRZ recording techniques where the bits of the byte are recorded in parallel channels on tape. In NRZI recording a "1" bit is represented by a flux reversal on tape and a "0" bit by no flux reversal (or vice versa). In NRZ recording, only a change in a track from "1" to "0" or "0" to "1" is recorded as flux reversal. Where no timing track or other synchronization bits are recorded (in order to obtain maximum efficiency of recorded bits on tape), prior tape systems permitted a maximum tolerable skew for bits within any single "byte" to be: one-half of a bit period, T, less the time required to reset a register receiving the bytes. Thus prior systems required a spacing of more than T/2 between skewed bytes in order to be able to group received bits into their assigned bytes. If the skew exceeded T/2, there was no assurance that the first or last bit of a byte might not be confused as part of the preceding or following byte.

In prior tape systems, the bits were received in their skewed order by a "sense" register. A "character gate" was used to sample simultaneously all bits of each registered byte (to deskew it) at a time within T/2 less reset time after the first bit of each byte was received. The register was reset as quickly as possible at or after the sampling so that it was prepared to receive the next byte.

The length of the "character gate" from the first received bit of a byte determines the maximum tolerable skew for a system, which as explained above could not exceed T/2 less reset time in prior systems not having sync bits. The reason for this is that a byte could conceivably be coded with only a single bit, which could occur in its most skewed track; and this "late" bit starts a "character gate" that must time-out (followed by a register reset) before the "earliest" possible bit of the next character. Also, this same "character gate" must be able to deskew bytes coded with all "1" bits, whereby the "earliest" "1" bit started the "character gate," which however could not sample the sense register until after all "1" bits of the byte had been received. Consequently, the "character gate" had to meet the limitations of both the single "1" bit and all "1" bit characters. This factor required that the character gate in prior NRZI or NRZ (not using timing bits) to be no greater than T/2 less the reset time for the register.

It is the principal object of this invention to provide a deskewing "character gate" system which can exceed "one-half bit period less reset time" that was the maximum tolerable skew of prior systems not using synchronization bits.

It is another object of this invention to provide plural "character gates," one or the other being chosen to sample a received byte by a redundancy check circuit.

This invention utilizes an error-detecting means with each byte to control the length of the "character gate" used to deskew the byte. A "count status means" tests the error status of each byte being received at a time before one-half bit period (T/2) from the first bit of the byte. If no error is indicated at the "test" time, all of the bits of the byte are determined to have been received and a "short" "character gate" is brought up to sample the received byte in the sense register. On the other hand, if a vertical-redundancy error indication is obtained at "test" time, the last bit of the byte has not yet been received, and a "long" character gate is brought up to sample the received bytes. The "count status means" includes any of the error checking circuits variously known as the parity check circuit, the vertical redundancy check ciicuit, the $m$ one bit out of $n$ bit position check circuit, etc. In each of these cases, a count of some type is made to determine the existence of an error. After the character gate determined by this invention is completed, the conventional parity check or count check may be used for any character.

The foregoing and other objects, features and advantages of the invention will be apparent from the following more particular description of preferred embodiments of the invention as illustrated in the accompanying drawings.

FIGURES 4A–J provide waveforms used in explaining the operation of the invention.

Figure 1:
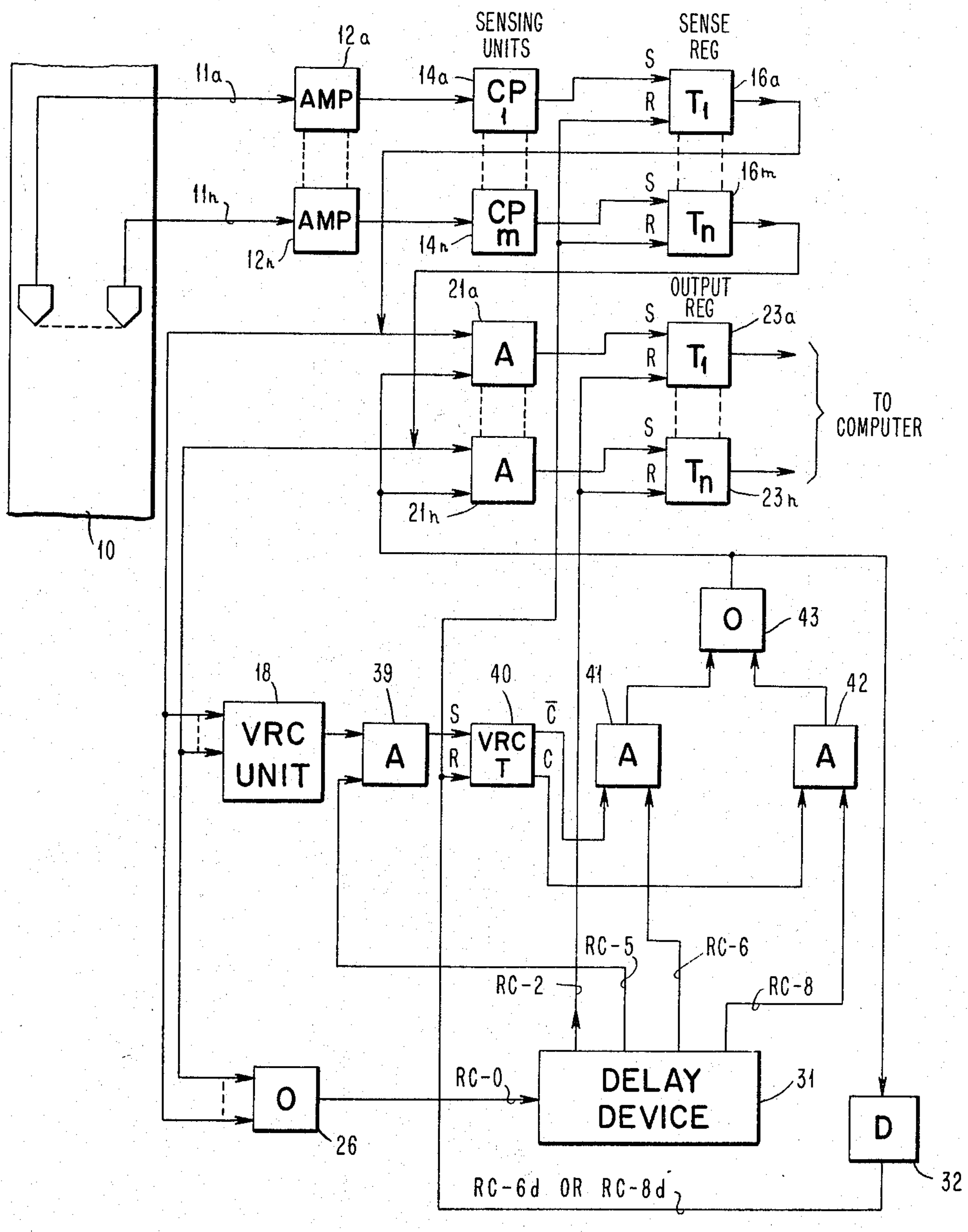
FIGURE 1 represents an embodiment of the invention.
Figures 2, 5:
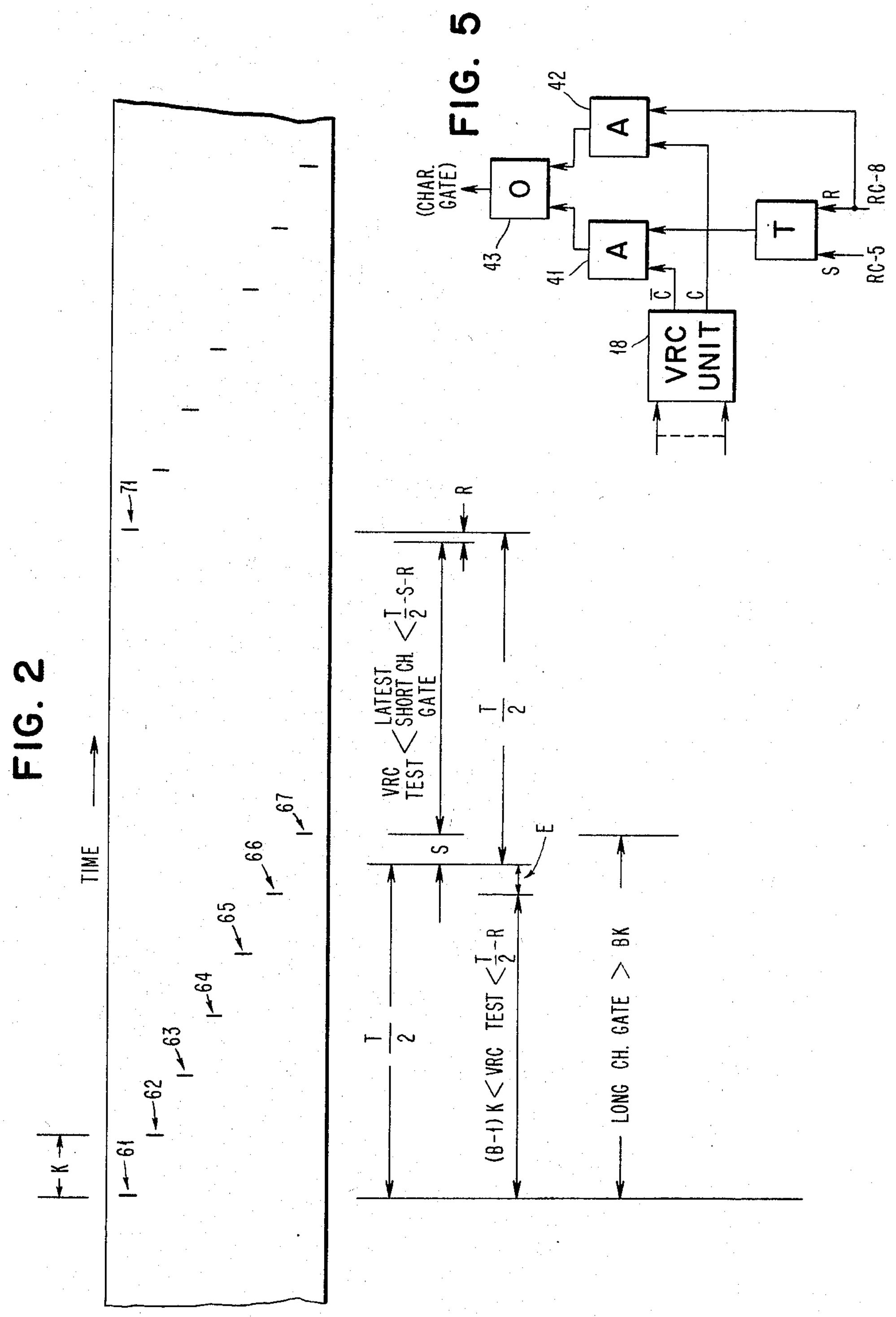
FIGURE 2 represents skewed conditions for a byte involved in the present invention.

FIGURE 5 illustrates a modification of the arrangement shown in FIGURE 1.

Reference is now made to the embodiment shown in FIGURE 1. A tape 10 is being read by a plurality of heads which are respectively connected to transmission lines 11*a–n* that terminate at inputs to respective amplifiers 12*a–n*. The heads read respective tracks recorded on tape. One or more blocks of data are recorded on the tape. Each block has a plurality of bytes, and each byte comprises one or more simultaneously recorded bits. However, due to slight misalignments of either the read heads or of the tape positions, the simultaneously recorded bits of a byte are not read simultaneously, but are read at different times to cause a skewed byte.

The bits of a skewed byte are passed through respective sensing units 14*a–n* for noise discrimination purposes before being set into a sense register comprising respective triggers 16*a–n*. Sensing units 14*a–n* may be the type disclosed in U.S. patent application No. 671,834, filed July 15, 1957 (now U.S. Patent No. 3,078,448), assigned to the same assignee as the present application.

The outputs of triggers 16*a–n* are provided to inputs of a vertical redundancy check (VRC) unit 18, which modulo-two sums the respective trigger outputs of register 16. VRC unit 18 is well known in the art having been used commercially for several years, and it generally comprises an Exclusive-OR circuit tree.

An OR circuit 26 has inputs that also receive the respective outputs of sense register 16. A delay device 31 receive the output of OR circuit 26. Accordingly, the first of trigger 16*a–n* to be set by the first bit of a byte provides the output of OR circuit 26, that actuates delay device 31 at a time designated as RC–0. Delay device 31 may be any of several delay devices well known in the art such as: single-shot delays, an oscillator-driven counter or ring arrangement, or a delay-line arrangement, etc. Whenever actuated, delay device 31 provides a sequence of output pulses RC–2, RC–5, RC–6 and RC–8 which are provided in sequence from the actuation at time RC–0. The pulse RC–5 is provided to an AND gate 39 which is used to sample the status of the output of VRC unit 18, at a time somewhat less than one-half bit period (T/2). A trigger 40 has its set input receive the output of VRC unit 18. If no error is indicated at time RC–5, trigger 40 is not set; but on the other hand if error does exist at that time, trigger 40 is set. If no error is indicated by trigger 40, its output $\overline{C}$ enables an AND gate 41 so that a "short character gate" RC–6 passes through an AND gate 41. On the other hand, if an error is indicated at time RC–5, AND gate 42 is enabled instead by the complementary output C from trigger 40 so that a "long character gate" RC–8 passes through an AND gate 42. Consequently, an OR circuit 43 connected to the output of AND gates 41 and 42 will provide an output of either a "short character gate" RC–6 or a "long character gate" RC–8, depending upon whether a vertical-redundancy error exists or not at the output of unit 18 at time RC–5.

The "character gate" output from OR circuit 43 is applied to AND gates 21*a–n* that respectively receive the outputs of triggers 16*a–n* to sample the output of register 16. Accordingly, AND gates 21 can sample the register 16 outputs with either a short or long character gate depending upon whether an error is sampled or not at time RC–5. The sampled outputs of AND gates 21 are set into an output register comprising triggers 23*a–n*. The outputs of the register 23 are provided to means not a part of this invention (such as a computer) at any time after a character is registered therein and before time RC–2, which resets output register 23 generated in response to the next following character in the clock.

The short or long character gate output of OR circuit 43 (RC–6 or RC–8) is also passed through a delay circuit 32 which provides only a very short delay compared to a bit period. The output of delay circuit 32 is either RC–6*d* or RC–8*d* which resets triggers 16*a–n* and VRC trigger 40.

FIGURE 2 illustrates the characteristics of this invention. A byte comprises seven bit positions 61–67, any of which may represent a "0" (no pulse) or a "1" (pulse) using NRZI recording. The bit positions 61–67 represent the time occurrence of respective bit positions rather than the manner in which the bits may actually appear on tape. Bit positions 61–67 are linearly skewed by a maximum amount and adjacent bits have a skewed time separation K. Thus in any track the bit positions are spaced by a period T, such as for example the spacing between bit positions 61 and 71.

This invention also presumes a coding for each byte wherein there is at least one "1" bit per byte such as is obtained with binary coding and odd parity or BCD (binary coded decimal) coding. Consequently, the first six bit positions 61–66 must occur within one-half bit period (T/2). The last bit position 67 can thus occur later than T/2 from the first bit position. Thus bit 67 occurs at a time S after T/2 from the first bit position of the byte. Also the second last bit position 66 will occur at a time E before the end of time T/2 from the first bit position of the byte. This analysis assumes linear skew, meaning that the spacing between adjacent bits K is equal for all adjacent bits. Linear skew represents a simplification for mathematical convenience. The skew quite often is not linear, but the explanation of this invention based on the linear skew will provide an understanding of the operation of the invention for varying conditions. The byte has a number B of bits. The reset time of register 16 is represented by R. Thus the earliest time that VRC unit 18 can be tested is at $(B-1)K$ after the first bit of the byte.

Also the shortest character gate at RC–6 must occur at less than $T/2-S-R$, and must be greater than the VRC test time, which is greater than $(B-1)K$ after the first "1" bit of a byte.

Thus the "short character gate" must be between $T/2-R$ and $(B-1)K$, and preferably as close to $(B-1)K$ as possible. Such a "character gate" must not occur before the first bit position 71 of the next byte.

On the other hand, the "long character gate" is determined by the earliest time that a character gate can be actuated, which is by first bit position. The result is that the "longest character gate" may extend beyond the half bit period (T)/2 by an amount $(K-R)/2$, and this is the amount by which this invention extends the character gate over that obtainable in the prior art for single "1" bit bytes without recorded timing bits.

Figure 3:
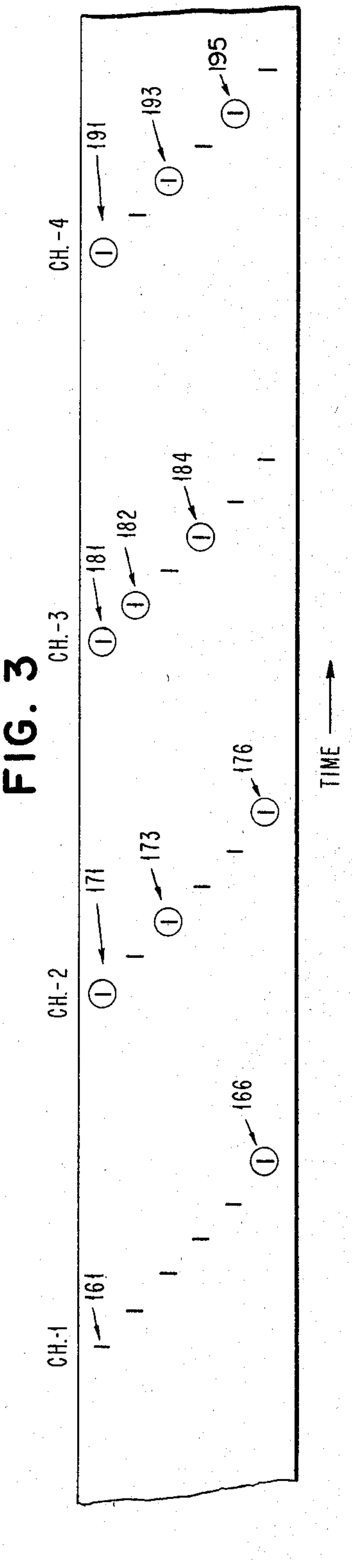
FIGURE 3 illustrates a series of coded bytes having maximum skew.
Figure 4:
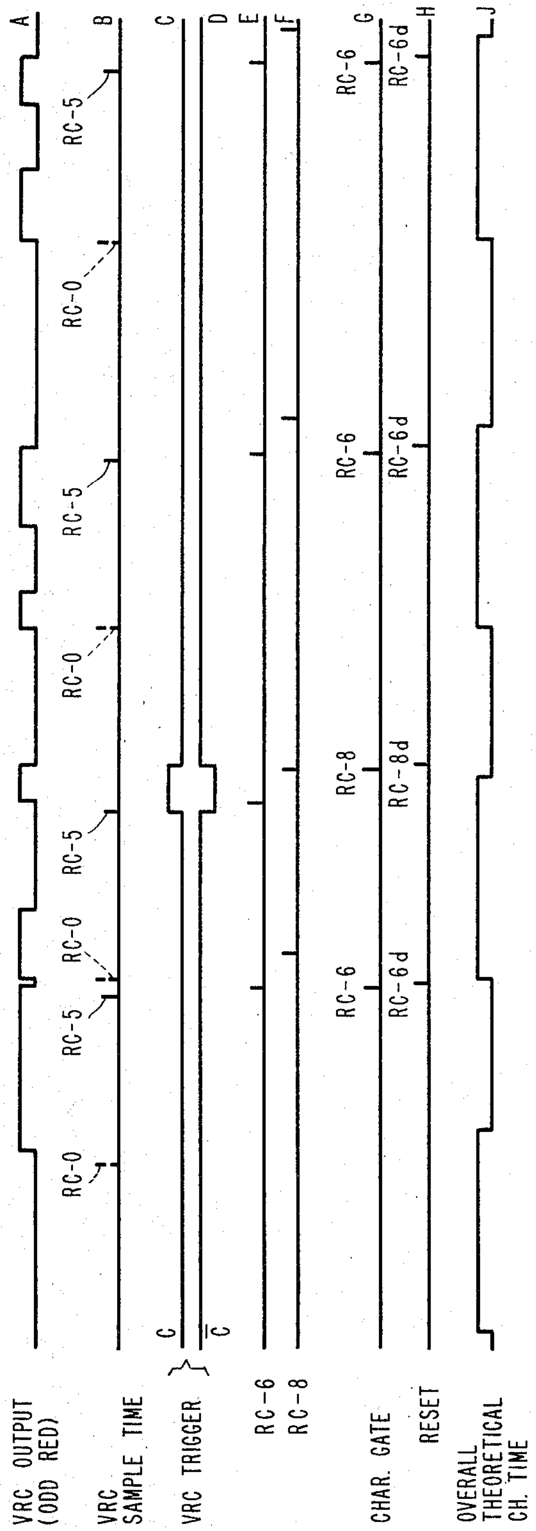

FIGURES 3 and 4A–J illustrate a time sequence of bytes having six bit positions and resulting waveforms found in the operation of the circuitry in FIGURE 1. Characters 1, 2, 3 and 4 are represented by "1" bits only in those positions having a circle. The bit positions not having a circle are assumed to be "0" bits represented by no pulse. Thus character −1 has only one "1" bit in position 166 which is the last bit position of the byte and there is no "1" bit in its first bit position 161 or other bit positions. FIGURE 4J represents the overall theoretical character time, which is the time during which all of the seven bit positions of each character occur; and hence the wave in FIGURE 4J is a symmetrical wave having the same form from cycle to cyle. But no such wave is derivable from data being read from tape since only "1" bit positions manifest themselves. FIGURE 4A represents the odd-parity VRC output of circuit 18. An odd number of received "1" bits in a byte bring up the output of VRC unit 18, and even numbers of "1" bits bring down the output. Thus the first "1" bit 166 brings up the output and the reset of triggers 16*a–n* by RC–6*d* or RC–8*d* brings down the output of VRC circuit as is noted in FIGURE 4A. Similarly during the second character, an output is brought up by bit 171, down by bit 173, and up again at bit 176.

The first "1" bit of each character actuates delay device 31 at RC–0. Thus at the first VRC sample time RC–5 shown in FIGURE 4B, the VRC output is up (meaning all bits of the byte have arrived at RC–5). The "short character gate" is enabled by the $\overline{C}$ output of trigger 40 to allow RC–6 to pass through gate 41 and be the character gate represented in FIGURE 4G. Shortly thereafter the delayed version of the character gate, RC–6*d* occurs before the first bit 171 of the next character. The bit positions for characters 1 and 2 illustrated in FIGURE 3 are the worst case conditions, wherein character 1 has its last bit as its only bit, and the next character has a "1" bit in its first bit position 171. While the second character is being received, the VRC sample finds that the VRC output is down indicating that there is an unreceived bit. This VRC trigger 40 is set by the error output of unit 18 at RC–5 and gate 42 is enabled to cause RC–8 to be the character gate. Accordingly, RC–8 occurs after the last "1" bit 176 is received, and the second character is deskewed. The third character has a "1" bit in its first position 181 and other bits in second and fourth bit positions 182 and 184. Thus at RC–5, there is no VRC error indicated; and the "short character gate" RC–6 is selected, which occurs before the last bit position 186 of the byte, but this causes no difficulty since there is no pulse at 187. Likewise, when the fourth character arrives, its three "1" bits at positions 191, 193 and 194 likewise occur before the VRC sample at RC–5, which finds no VRC error and again the short character gate RC–6 is used.

FIGURE 5 illustrates a modification to FIGURE 1 that provides a variable character gate. In FIGURE 5, gates 41 and 42 are connected to alternate outputs C and $\overline{C}$ of VRC unit 18. A trigger 140 is set by each RC–5 pulse to provide an enabling input to gate 41. Trigger 140 is reset by RC–8.

In operation, at RC–5 trigger 140 is set and if no VRC error exists, output $\overline{C}$ enables gate 41 so that a character gate is provided at time RC–5, which causes a reset pulse RC–5*d* through delay circuit 32 in FIGURE 1. On the other hand, if a VRC error is indicated at RC–5 then no output occurs from either gate 41 or 42. But as soon as the last bit arrives to drop the VRC output, gate 41 is enabled at that instant to provide a character gate, which likewise transfers the data and provides a reset through delay 32. In this manner a variable character gate can be provided at any time between RC–5 and RC–8. In any case, a character gate is provided at RC–8 by its direct connection to gate 42 if a VRC error should exist at that time, such as can occur upon an actual transmission error.

The description of this invention up to this point assumes that no bit dropout has occurred within any bytes being received. Such error, however, can be handled utilizing the system disclosed and claimed in another U.S. patent application by the same inventor having Ser. No. 234,151 (now U.S. Patent No. 3,222,603), filed Oct. 30, 1962 titled "First Bit Generator for Binary Tape Systems." The invention of that application can be applied to the invention of the present invention to permit extending the character gate of marginal bytes. In that prior patent application, a pair of registers were used, designated as a "low register" and a "high register." The "low register" is normally used except when a parity error is obtained. This invention can be applied to both the "high register" and the "low register" of that prior application.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An extended skew system comprising:
- means for receiving bits of skewed bytes,
- means for testing the count status of received bits of each byte said count status having one of two states at a predetermined test time, said test time occurring less than one-half bit period after a first received bit of the byte,
- delay means for enabling a variable character gate,
- and means for extending said character gate at said test time when said count status is at a predetermined one of said two states.

2. A multiple character-gate system for deskewing received bytes comprising:
- means for separately registering each bit of each received byte when received,
- a count status means for detecting the absence of a bit in any received byte and having one of two states at a predetermined test time,
- means for testing said count status means at said test time less than one-half bit period after the first bit of each byte is received,
- means providing a short gate in response to said first bit,
- means providing a long gate in response to said first bit,
- and means for selecting a character gate as the long gate to sample the output of said registering means if a predetermined one or two states from said count status means was found at said testing time for that byte, or for selecting the short gate to sample the output of said registering means if the other of said two states was found at said testing time for that byte.

3. A multiple-character gate system for deskewing received bytes containing error-detecting redundancy comprising:
- at least one sense register for separately registering each bit of each received byte when received,
- a vertical redundancy check unit connected to the output of said register for modulo-two summing the bits registered in said sense register,
- means for testing the output of said vertical redundancy check unit at a time less than one-half bit period after the first bit of each received byte,
- bistable means being set in response to the testing of said vertical redundancy check unit,
- means for generating a short character gate less than one-half bit period and greater than the vertical redundancy unit test time from the first bit of each received byte,
- means for generating a long character gate greater than the time needed for receiving all the bits of a skewed byte but less than one bit period,
- means for selecting either the short character gate or the long character gate in response to the output of said vertical redundancy testing bistable device,
- means for sampling the output of said sense register in response to the character gate selected by said selecting means.

4. An extended skew system for deskewing bits read from magnetic tape not utilizing synchronization bits recorded thereon comprising:
- a plurality of reading heads respectively reading the tracks of said tape,
- sensing units respectively receiving the outputs of said heads,
- at least one sense register respectively receiving the outputs of said sense units, an AND gate arrangement for sampling the respective outputs of said sense register,
- a redundancy check unit also receiving the outputs of said sense register,
- an OR circuit arrangement also receiving the outputs of said sense register,
- a delay device being actuated by an output of said OR circuit to provide a plurality of outputs having different delay times to provide a redundancy sample output, followed by a short gate output, followed by a long gate output,
- a redundancy gate receiving the output of said redundancy unit and being enabled by said redundancy sample output,
- a redundancy indicating bistable device being set in response to an error indicating output of said redundancy gate,
- a pair of AND gates respectively receiving the short and long gate outputs, said AND gates being oppositely actuated by the output of said redundancy indicating bistable device,
- and means connecting the outputs of said alternately-actuated AND gates to said AND gate arrangement to transfer the bits from said sense register in a deskewed manner.

5. A deskewing system as defined in claim 4 in which a delay means providing a very short delay is also connected in common to the output of said connecting means to provide only a very short delay compared to a bit period,
- and means connecting the output of said delay means to reset inputs of said sense register and said redundancy indicating bistable device in response to output of said connecting means.

6. A multiple character-gate system for deskewing received bits containing error detecting redundancy comprising:
- at least one sense register for separately registering each bit of each byte when received, a vertical redundancy check unit connected to the output of said register for modulo-two summing the bits registered in said sense register, means for generating at least a pair of sequential pulses, one being less than a half bit period and the other being greater than a half bit period but less than one bit period after a first bit of a byte, bistable means being set in response to the first pulse of said generating means, and gating means receiving the outputs of said bistable means and said vertical redundancy check unit means, whereby the output of said gating means can provide a variable character gate for sampling the output of said sense register at or after said first pulse.

References Cited by the Examiner

UNITED STATES PATENTS

| | | | |
|---|---|---|---|
| 2,977,578 | 3/1961 | Daniels et al. ______ | 340—174.1 |
| 3,130,392 | 4/1964 | Miller ___________ | 340—174.1 |

BERNARD KONICK, *Primary Examiner.*

A. I. NEUSTADT, *Assistant Examiner.*